Nov. 19, 1963    J. KERTI    3,111,468
RECOVERING METALS FROM AQUEOUS SULFATE SOLUTIONS
Filed Aug. 30, 1961
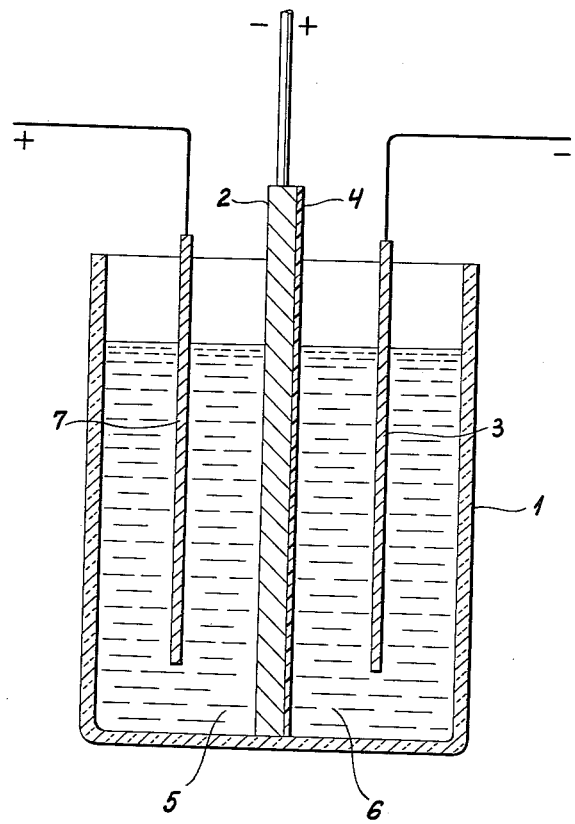
Jozsef KERTI
INVENTOR.
BY    Karl F. Ross
AGENT

United States Patent Office 3,111,468
Patented Nov. 19, 1963

3,111,468
RECOVERING METALS FROM AQUEOUS
SULFATE SOLUTIONS
József Kerti, 4 Pannonia Utca, Budapest XIII, Hungary
Filed Aug. 30, 1961, Ser. No. 135,412
6 Claims. (Cl. 204—112)

This invention relates to recovering metals from aqueous sulfate solutions.

It is known that from aqueous sulfate solutions only the noble metals can be directly recovered which can be deposited at a discretional pH value by using insoluble anodes. The reason for this is that, in case of the noble metals, the anodic acidification taking place according to the following equation $$MeSO_4 + H_2O = H_2SO_4 + Me + \tfrac{1}{2}O_2 \qquad (1)$$

does not harmfully influence the cathodic deposition, because the deposition potential of the hydrogen is considerably more negative than that of the noble metals.

In the case of the metals that are to be found in the middle of the electrochemical-potential series and form insoluble hydroxides, such as the cobalt, nickel, cadmium, manganese, and zinc, the situation is different. These metals can be deposited from an aqueous solution only if during electrolysis the pH value is held between certain narrow limits. Thus, if the solution becomes acidic, hydrogen alone evolves at the cathode and only a decomposition of water occurs. On the other hand, if the solution becomes alkaline, the metal ions are precipitated in the form of insoluble hydroxides. The refinement and the galvanotechnical deposition can be realized only by the aid of an insoluble anode, while the pH of the aqueous solution is adjusted by the aid of different buffer additives. The respective yields form cathodic deposition and anodic dissolution are not necessarily identical; therefore it is often difficult to stabilize the pH. However, if the anode is insoluble and therefore oxygen is evolved on its surface, the solution becomes acidic and no electrolytic recovery of the metal at all can be carried out on the basis of Equation 1.

Till now, the problem of electrolytic recovery of non-ferrous metals from sulfate solutions has been solved solely in the case of zinc, with the aid of the so-called Tainton process, which is based on the fact that on zinc the overvoltage of hydrogen is high, hence the acidification of the solution is not disadvantageous. However, during the process the concentration of the sulfuric acid must be kept below 12% because otherwise the current yield is considerably diminished.

The other non-ferrous metals are generally produced in the pyrometallurgical way, but the purity of the thus-obtained metal is not satisfactory; therefore generally an electrolytic refinement is necessary with the metal forming the soluble anode.

By the process according to the invention, all the above-described disadvantages can be eliminated. The invention is based on the surprising recognition that when active lead is used as an insoluble anode, the non-ferrous metals can be recovered from the aqueous solution of their sulfates in a hydroelectrometallurgical way. More particularly, as long as active lead is present on the anode, depending on the concentration of the solution, the anodic process consists in the formation of lead sulfate and/or lead hydroxide:

$$MeSO_4 + Pb = PbSO_4 + Me \qquad (2)$$
$$Pb + 2HOH = Pb(OH_2) + H_2 \qquad (3)$$

On the basis of these equations it is apparent that reaction 1 causing the harmful acidification of the solution is eliminated by the employment of the active-lead electrode, with automatic adjustment of the pH value to a level which is most advantageous from the point of view of current yield. If the pH becomes too low, i.e. should the solution go acidic, the following process takes place:

$$Pb + H_2SO_4 = PbSO_4 + H_2 \qquad (4)$$

with evolution of hydrogen at the cathode. On the other hand, if the pH is too high, i.e. if the solution is alkaline, according to Equation 3 lead hydroxide is formed at the anode. The value of the pH is influenced by both processes in a favorable direction. Inasmuch as the pH value automatically adjusts to an optimum current yield, the lead sulfate formed on the anode is always equivalent to the quantity of the recovered metal, and the lead hydroxide is also equivalent to the evolved hydrogen. Consequently, the value of the pH remains constant until sulfatable lead is available at the anode.

The solubility product of the lead hydroxide is considerably lower than that of the lead sulfate; therefore the pH value can be controlled by the current density. Thus, with increasing the current density pH is increased too, because on the cathode more hydrogen is deposited than the quantity of the hydroxide deposited on the anode in the form of $Pb(OH)_2$, whereas a decrease of the current density results in the diminution of the pH of the solution. With suitable current density the pH remains practically constant; consequently, the pH value as the most important parameter of the process can be controlled by the aid of the anodic reaction without employment of any buffer additive.

Generally, the present improvement can be described as metals lying in the electrochemical-potential series between hydrogen and zinc and forming sulfates that are readily soluble in water; in this process, during the hydroelectrometallurgical deposition of the metal from the aqueous solution of the metal sulfate, a metal electrode insoluble in the electrolyte and capable of reversibly participating in the sulfate-forming anodic reaction is used as anode.

Thus, the process according to the invention essentially eliminates the electrolytic metal purification of the pyrometallurgical processes. The invention solves the problem of producing pure metal in a hydrometallurgical way by using an insoluble anode.

In practicing the process according to the invention it is advantageous to use as the insoluble anode a lead electrode, such as a box plate of the type used in the manufacture of acid storage batteries containing a substantial quantity of active lead.

The sulfate of one or more metals forming soluble hydroxides and having an electrode potential more negative than that of the metal to be deposited can be added to the electrolyte solution containing the sulfate of the metal to be deposited. For example, sodium sulfate can be used as the metal-sulfate addition to the electrolyte, advantageously in a quantity corresponding to the saturation concentration of the electrolyte. The sulfate, addition, especially the sodium sulfate diminishes the internal resistance of the electrolysing cell and thus contributes to the compact deposition of the metal.

When employing the process according to the invention for producing nickel, it is advantageous to electrolyze a nickel sulfate solution containing sodium sulfate, using a lead anode. To keep the current yield at a favorable value, it is advantageous to use a nickel sulfate solution having an initial content in nickel ions exceeding 50 g. per liter.

The reactivation of the metal electrode used as the insoluble anode and the regeneration of the sulfuric acid can be carried out, pursuant to another feature of the invention, in the same cell, but in an aqueous solution other than the one from which the sulfate-forming metal was recovered, according to the following equation:

$$PbSO_4 + H_2O = Pb + H_2SO_4 + \tfrac{1}{2}O_2 \qquad (5)$$

A further advantage of this method is that the sulfuric acid is gained separately, whereby the cathodic deposition is not disturbed by the hydrogen ions of the acid.

The insoluble electrode containing the active metal can be used at the same time as a diaphragm; on one side of said diaphragm the salt solution is electrolyzed, while on the other side of the diaphragm the active-metal electrode and the sulfuric acid are regenerated. The separation of the solution of the metal sulfate from the sulfuric acid can be carried out with the aid of a special diaphragm, advantageously a microporous PVC plate, or by using a diaphragm anode and a separate diaphragm. An electrode containing granulous lead can be used as the insoluble anode of the electrolyzing cell, said granulous lead being mixed with a substance hindering the agglomeration of granules, such as powder of barium sulfate.

To hinder the shedding of the active mass, a shielding lining put on the insoluble anode, such as a textile fabric of glass and nylon fibers, can be employed.

The reactivation of the lead sulfate is possible in the same way as in the charging of the negative electrode of a lead storage battery, that is by cathodic reduction carried out by using an indifferent auxiliary anode, such as a lead anode containing silver in a low quantity. Sulfuric acid in a quantity equivalent to that of the metal produced in this way is simultaneously formed, and this sulfuric acid can be used to dissolve the metal content of the raw material. In this way the sulfate ions take part in a cycle, because after dissolving the metal or metal compound they get back into the metal-depositing space in the form of metal sulfate. Accordingly, the cycle has two periods. In the first one the electrode containing the active lead is anodically sulfatized. In the second step, the lead is reactivated, with the simultaneous recovery of the sulfuric acid usable for dissolving the raw material, while the sulfuric acid can be concentrated to 30–40%.

The sole FIGURE of the accompanying drawing illustrates a cell for carrying out the process according to the invention.

The vessel 1 is subdivided by a microporous polyvinylchloride diaphragm 4 into a cell compartment 6 for the electrolysis of the metal salt and a cell compartment 5 for the regeneration of sulfuric acid. Thus, the anode 2 of active lead is oxidized to insoluble lead sulfate while the metal to be recovered is reduced and deposited at the inert cathode 3 which is negative with respect to the anode. The anode is, however, negative with respect to a more anodic auxiliary electrode 7 spaced therefrom in the regenerating compartment 5 so that, in this compartment, the lead sulfate is decomposed into active lead while sulfuric acid accumulates.

Before electrolysis, any impurities present in the raw material must be removed if the process is otherwise disturbed by them. According to the quality of the impurity, the methods of preparing the electrolysis can be different. The process is not disturbed by the sulfates of the light metals; actually an electrolyte containing sodium sulfate is—as mentioned above—desirable from several points of view.

The length of time of sulfatation of the metal electrode depends on the current density and the capacity of the lead electrode.

The process according to the invention can be extremely advantageously used to produce the negative mass of alkaline storage cells, further to work up ferrous sulfate solutions obtained while preparing iron objects for galvanotechnical purposes, and to solve the problem of sewage purification presenting a permanent problem for the industrial specialists.

The process according to the invention is further illustrated by the following examples.

*Example 1*

In order to produce nickel from raw material consisting of nickel or nickelous sulfide, the oxide is first produced by the usual metallurgical preparatory operations, an oxide which is dissolved in an electrolytically produced solution having a concentration of about 20% calculated as sodium sulfate and of about 30% calculated as sulfuric acid. The solution so obtained containing sodium sulfate and nickel sulfate, is electrolyzed in the sulfate-decomposing space by the use of a box plate containing active lead as an anode and of a rolled iron plate as a cathode. As is well known, the box-plate anode contains the active lead agent between two perforated lead foils, in a layer thickness of about 8 to 10 mm. The box plate is so disposed as to divide the cell into two parts such as the compartments 5 and 6 shown in the figure serving this way at the same time as a diaphragm. To reduce the shedding of the mass, the box plate is covered by a bag made of nylon fabric.

The electrolysis is performed at 40° C., with a cathodic current density of 100 a./m.², in cells connected in series. The solution of nickel sulfate is transferred from cell to cell until its concentration has diminished to 25–30% of the original one. Then the remainder of the nickel sulfate is precipitated by lime, and the settled precipitate is mixed to the raw material and again dissolved in sulfuric acid.

The active-lead electrode is regenerated by connecting it as a cathode and reducing it in a solution containing sodium sulfate and sulfuric acid. A lead electrode is used as the auxiliary anode 7. The current density amounts to 100 a./m.². The solution is transferred from cell to cell, while the sulfuric-acid content of the solution continuously increases. Into the front portion of the series of cells producing sulfuric acid is introduced the sodium sulfate solution which was left over after precipitation of the residual nickel by lime and the settling of the precipitate. In this way, the sodium sulfate remains in the cycle.

The metal produced in this way is separated from the cathode plate in the usual way, then it is washed, dried and smelted.

*Example 2*

The regeneration of iron-pickling solutions and the hydroelectrometallurgical recovery of iron can be carried out as follows:

In the sulfate-decomposing space, the ferrous sulfate solution is circulated from cell to cell. The electrolysis is performed in a temperature interval ranging from 40° to 50° C. with a current density of 400 to 500 a./m.². Under such circumstances, pure sponge iron is obtained which, according to the purpose of its employment, is smelted under a reducing atmosphere or is prepared for the manufacture of powdered-iron cores. In both cases it is preferable to wash the product advantageously by a solution containing a small quantity of an inhibitor.

The sulfuric acid necessary for the pickling is regenerated in the cycle producing sulfuric acid to the desired concentration, or sulfuric acid more concentrated than is needed for the process is produced and is diluted according to necessity. The solution, which in the sulfate-decomposing space became diluted with regard to iron, is acidified by the sulfuric acid produced previously, and then this solution is fed back into the pickling plant. A lead plate having a large surface is employed as an auxiliary anode having a surface form identical with that of the positive electrodes of conventional lead storage cells.

*Example 3*

The negative mass of cadmium-nickel storage cells is prepared in the following way.

An electrolyte containing per liter 130 g. of iron, 9 g. of cadmium and 1 g. of nickel in the form of bivalent sulfates is electrolyzed by a cathodic current density of 10 to 12 a./dm.² and an anodic current density of 3 to 4 a./dm.², the solution circulating from cell to cell in a row of cells connected in series. Aluminum tubes having a diameter of about 1.5 cm. placed in a sack made of plastic fabric to facilitate the removal of the produced mass from the cell, are employed as the cathode. A box plate is used as the anode. The electrolysis is carried out at 40 to 45° C. The iron, cadmium, and nickel content of the solution is made up from time to time.

The mass produced in this way contains 20% of iron and 80% of cadmium, besides nickel of minimum quantity. The mass is thoroughly washed, then treated in the usual way.

The iron content of the active mass produced in this way not only may impede the cohesion of the active cadmium but also takes part in the current-producing process. The sulfuric acid obtained during the process can be employed for any desired purposes.

What I claim is:

1. A process for recovering a metal located in the electrochemical-potential series intermediate hydrogen and zinc and forming a sulfate salt highly soluble in water from an aqueous solution of said salt, comprising the steps of electrolyzing said solution in an electrolytic cell between an anode formed from a metal insoluble in said solution and adapted to form a sulfate salt insoluble in said solution upon oxidation at said anode and a cathode at which the metal to be recovered is deposited, and reactivating said anode in said cell to regenerate said insoluble metal and sulfuric acid by passing an electric current between said anode and a more anodic auxiliary electrode through an aqueous solution other than said solution of said salt, said cell being partitioned by said anode to separate said aqueous solution from said solution of said salt.

2. A process for recovering a metal located in the electrochemical-potential series intermediate hydrogen and zinc and forming a sulfate salt highly soluble in water from an aqueous solution of said salt, comprising the steps of electrolyzing said solution in an electrolytic cell between an anode formed from a comminuted active lead adapted to form lead sulfate insoluble in said solution upon oxidation at said anode and a cathode at which the metal to be recovered is deposited, and reactivating said anode in said cell to regenerate said active lead and sulfuric acid by passing an electric current between said anode and a more anodic auxiliary electrode through an aqueous solution other than said solution of said salt, said cell being partitioned by said anode to separate said aqueous solution from said solution of said salt.

3. A process for recovering a metal located in the electrochemical-potential series intermediate hydrogen and zinc and forming a sulfate salt highly soluble in water from an aqueous solution of said salt, comprising the steps of electrolyzing said solution in an electrolytic cell between a microporous anode formed from a metal insoluble in said solution and adapted to form a sulfate salt insoluble in said solution upon oxidation at said anode and a cathode at which the metal to be recovered is deposited, and simultaneously reactivating said anode in said cell to regenerate said insoluble metal and sulfuric acid by passing an electric current between said anode and a more anodic auxiliary electrode through an aqueous solution other than said solution of said salt in said cell, said cell being partitioned by said anode to separate said aqueous solution from said solution of said salt.

4. A process for recovering a metal located in the electrochemical-potential series intermediate hydrogen and zinc and forming a sulfate salt highly soluble in water from an aqueous solution of said salt, comprising the steps of electrolyzing said solution in an electrolytic cell between an anode formed from a metal powder insoluble in said solution and adapted to form a sulfate salt insoluble in said solution upon oxidation at said anode and a cathode at which the metal to be recovered is deposited, said insoluble metal powder being disposed along a surface of a microporous polyvinylchloride diaphragm remote from said cathode, and simultaneously reactivating said anode in said cell to regenerate said insoluble metal, and sulfuric acid by passing an electric current between said anode and a more anodic auxiliary electrode through an aqueous solution other than said solution of said salt separated therefrom within said cell by said diaphragm.

5. A process for recovering a metal located in the electrochemical-potential series intermediate hydrogen and zinc and forming a sulfate salt highly soluble in water from an aqueous solution of said salt, comprising the steps of electrolyzing said solution in an electrolytic cell between an anode formed from an active lead powder adapted to form lead sulfate insoluble in said solution upon oxidation at said anode and a cathode at which the metal to be recovered is deposited, said metal powder being disposed along a surface of a microporous diaphragm remote from said cathode, and admixing with a substance hindering the agglomeration of the lead powder, and reactivating said anode in said cell to regenerate said active lead and sulfuric acid by passing an electric current between said anode and a more anodic auxiliary electrode through an aqueous solution other than said solution of said salt separated therefrom in said cell by said diaphragm.

6. A process for recovering a metal located in the electrochemical-potential series intermediate hydrogen and zinc and forming a sulfate salt highly soluble in water from an aqueous solution of said salt, comprising the steps of electrolyzing said solution in an electrolytic cell between an anode formed from an active lead powder adapted to form lead sulfate insoluble in said solution upon oxidation at said anode and a cathode at which the metal to be recovered is deposited, said metal powder being disposed along a surface of a microporous diaphragm remote from said cathode and admixed with barium sulfate for hindering the agglomeration of the lead powder, and reactivating said anode in said cell to regenerate said active lead and sulfuric acid by passing an electric current between said anode and a more anodic auxiliary electrode through an aqueous solution other than said solution of said salt separated therefrom in said cell by said diaphragm.

References Cited in the file of this patent

UNITED STATES PATENTS

| | | |
|---|---|---|
| 789,523 | Betts | May 9, 1905 |
| 1,055,652 | Reed | Mar. 11, 1913 |
| 2,176,427 | Kershaw | Oct. 17, 1939 |
| 2,478,189 | Gronningsaeter | Aug. 9, 1949 |